US012584775B2

(12) United States Patent
Itatani

(10) Patent No.: US 12,584,775 B2
(45) Date of Patent: Mar. 24, 2026

(54) TEMPERATURE SENSOR AS WELL AS MASS FLOW METER AND MASS FLOW CONTROLLER COMPRISING THE SAME

(71) Applicant: Kuwana Metals, Ltd., Kuwana (JP)

(72) Inventor: Masaaki Itatani, Mie Ken (JP)

(73) Assignee: Kuwana Metals, Ltd., Kuwana (JP)

( * ) Notice: Subject to any disclaimer, the term of this patent is extended or adjusted under 35 U.S.C. 154(b) by 82 days.

(21) Appl. No.: 18/011,889

(22) PCT Filed: Sep. 3, 2021

(86) PCT No.: PCT/JP2021/032399
§ 371 (c)(1),
(2) Date: Dec. 21, 2022

(87) PCT Pub. No.: WO2022/059513
PCT Pub. Date: Mar. 24, 2022

(65) Prior Publication Data
US 2023/0358584 A1    Nov. 9, 2023

(30) Foreign Application Priority Data

Sep. 16, 2020    (JP) ................................. 2020-155385

(51) Int. Cl.
*G01F 1/684*        (2006.01)
*G01F 5/00*         (2006.01)
(Continued)

(52) U.S. Cl.
CPC ............ *G01F 1/684* (2013.01); *G01F 1/6842* (2013.01); *G01F 5/00* (2013.01); *G01F 15/005* (2013.01);
(Continued)

(58) Field of Classification Search
CPC .......... G01F 1/684; G01F 1/6842; G01F 5/00; G01F 15/005; G01F 15/02; G01F 25/10; G01F 15/00; G01K 1/14; G01K 13/02
See application file for complete search history.

(56) References Cited

U.S. PATENT DOCUMENTS 4,210,016 A * 7/1980 Peter ..................... G01F 1/6842
                                                    73/114.34
4,280,360 A * 7/1981 Kobayashi ................ G01F 1/64
                                                    138/40
(Continued)

FOREIGN PATENT DOCUMENTS

CN          101939624 A *  1/2011 ........... G01F 1/6842
CN          102119322 A *  7/2011 ........... G01F 1/6842
(Continued)

OTHER PUBLICATIONS

JP-59171823-A, English Translation (Year: 1984).*
(Continued)

*Primary Examiner* — Ryan D Walsh
(74) *Attorney, Agent, or Firm* — NOD Law PC

(57)    ABSTRACT

A temperature sensor used for a mass flow meter is constituted by a flow channel through which a fluid flows, a temperature measuring means which has a temperature measuring point in a central part of a cross section of the flow channel, and a temperature uniformalizing means disposed on an upstream side from the temperature measuring point in the flow channel. The temperature uniformalizing means comprises a grid disposed so as to continuously extend in arbitrary directions perpendicular to a direction in which a fluid flows, and sub flow channels divided by said grid. Thereby, a temperature sensor which can acquire a measured temperature value representing temperature of the
(Continued)

fluid even in a case where temperature of the fluid supplied to a mass flow meter from the outside altered can be realized.

15 Claims, 9 Drawing Sheets

(51) Int. Cl.

| | | |
|---|---|---|
| *G01F 15/00* | (2006.01) | |
| *G01F 15/02* | (2006.01) | |
| *G01F 25/10* | (2022.01) | |
| *G01K 1/14* | (2021.01) | |
| *G01K 13/02* | (2021.01) | |

(52) U.S. Cl.

CPC .............. *G01F 15/02* (2013.01); *G01F 25/10* (2022.01); *G01K 1/14* (2013.01); *G01K 13/02* (2013.01); *G01F 15/00* (2013.01)

(56) References Cited

U.S. PATENT DOCUMENTS

| | | | | |
|---|---|---|---|---|
| 4,665,950 A * | 5/1987 | Fruh | ................. | F16L 55/02718 |
| | | | | 138/40 |
| 5,121,658 A * | 6/1992 | Lew | .......................... | G01F 1/10 |
| | | | | 73/195 |
| 5,303,584 A * | 4/1994 | Ogasawara | ............... | G01F 5/00 |
| | | | | 73/114.34 |
| 5,482,249 A * | 1/1996 | Schafbuch | ............ | F16K 5/0605 |
| | | | | 138/44 |
| 7,516,761 B2 * | 4/2009 | Setescak | ................... | F15D 1/02 |
| | | | | 138/44 |
| 2010/0251815 A1 | 10/2010 | Schnur et al. | | |

FOREIGN PATENT DOCUMENTS

| | | | | | | |
|---|---|---|---|---|---|---|
| JP | S55168181 | U | | 12/1980 | | |
| JP | 59171823 | A | * | 9/1984 | | |
| JP | H03179222 | A | | 8/1991 | | |
| JP | 3000649 | U | | 8/1994 | | |
| JP | H07230322 | A | | 8/1995 | | |
| JP | H08063235 | A | | 3/1996 | | |
| JP | H11287733 | A | | 10/1999 | | |
| JP | 2002243515 | A | | 8/2002 | | |
| JP | 2003065816 | A | | 3/2003 | | |
| JP | 2004093170 | A | * | 3/2004 | .............. | F15D 1/02 |
| JP | 2011064278 | A | | 3/2011 | | |
| JP | 2011508193 | A | | 3/2011 | | |
| JP | 2012159301 | A | | 8/2012 | | |
| JP | 5689408 | B2 | | 3/2015 | | |
| JP | 2020123065 | A | | 8/2020 | | |
| JP | 2022508193 | A | | 1/2022 | | |
| KR | 101543278 | B1 | | 8/2015 | | |
| WO | WO-0161282 | A2 | * | 8/2001 | .............. | G01F 1/40 |
| WO | WO-2009080120 | A1 | * | 7/2009 | .......... | G01F 1/6842 |
| WO | 2015141437 | A1 | | 9/2015 | | |

OTHER PUBLICATIONS

CN-102119322-A, English Translation (Year: 2011).*
JP-2004093170-A, English Translation (Year: 2004).*
WO-0161282-A2, English Translation (Year: 2001).*
WO-2009080120-A1, English Translation (Year: 2009).*
CN-101939624-A, English Translation (Year: 2011).*
Japan Patent Office, "International Search Report Regarding International Application No. PCT/JP2021/032399", pp. 9, Published in: JP.
Ikame, Satoshi, Notice of Reasons for Refusal issued in Japanese Patent Application No. 2022-550466, Apr. 2, 2025, 8 pages.

* cited by examiner (a)                  (b)

(a)                    (b)

(a)

(b)

(c)

(d)

TEMPERATURE SENSOR AS WELL AS MASS FLOW METER AND MASS FLOW CONTROLLER COMPRISING THE SAME

FIELD

This invention relates to a temperature sensor used for a mass flow meter.

BACKGROUND

A mass flow controller is an apparatus which comprises a mass flow meter and a flow control valve and adjusts an opening of the flow control valve such that a mass flow rate of a fluid measured by the mass flow meter coincides with a target value. Mass flow controllers have been widely used for the purpose of supplying a fixed quantity of a gas used for manufacturing processes of semiconductor manufacturing equipment. In recent years, various kinds of gases are used in association with progress of semiconductor manufacturing technology. Some gases among such gases must be handled while maintaining their temperature higher than room temperature for the purpose of preventing liquifaction thereof in a flow channel for example.

Volume and pressure of a gas largely change according to temperature. Therefore, in order to supply a fixed quantity of a gas in a high accuracy in a mass flow controller, it is preferable to measure temperature of the gas flowing inside of the mass flow controller correctly. Some conventional mass flow controllers comprise a temperature sensor for the purpose of measuring temperature of a gas. For example, inventions of mass flow controllers with a temperature sensor disposed inside or on a surface of a main body block are respectively described in Japanese Patent Application Laid-Open (kokai) No. H07-230322 and Japanese Patent Application Laid-Open (kokai) No. 2020-123065 (Patent Documents 1 and 2), and an invention of a mass flow controller with a temperature sensor attached so as to face a flow channel inside a main body block is described in Japanese Patent Application Laid-Open (kokai) No. H08-63235 (Patent Document 3).

Moreover, heat capacity per unit volume of a gas is very small as compared with a solid or liquid. Therefore, when temperature of a flow channel formed inside a mass flow controller differs from temperature of a gas in contact with this, there is a possibility that heat exchange may happen between the both and the temperature of the gas with small heat capacity may change easily. In some of conventional mass flow controllers, a main body block (base) and a flow sensor is covered by a metal block and thereby temperature of the whole flow channel of a gas can be maintained at a high temperature by a heater which the block comprises (see, e.g., International Patent Publication No. WO2015/141437, Patent Document 4). When such a mass flow controller is used, since temperature of a gas which flows inside and temperature of an inner wall of a flow channel with which the gas is in contact can be made identical to each other, a gas which is easily liquefied at room temperature can be supplied stably at a fixed quantity.

SUMMARY

An aspect of the present disclosure may be characterized as a temperature sensor used for a mass flow meter that comprises a flow channel through which a fluid flows, a temperature measuring means which has a temperature measuring point at a predetermined position inside said flow channel, and a temperature uniformalizing means disposed on an upstream side from said temperature measuring point in said flow channel. In addition, said temperature uniformalizing means comprises a grid constituted by periodically arranged partitions and disposed so as to continuously extend in two or more different arbitrary directions in a plane perpendicular to a direction in which a fluid flows, and sub flow channels divided by said grid.

Another aspect may be characterized as a mass flow meter comprising a flow channel through which a fluid flows, a temperature measuring means which has a temperature measuring point at a predetermined position inside said flow channel, and a temperature uniformalizing means disposed on an upstream side from said temperature measuring point in said flow channel. The temperature uniformalizing means comprises a grid constituted by periodically arranged partitions and disposed so as to continuously extend in two or more different arbitrary directions in a plane perpendicular to a direction in which a fluid flows, and sub flow channels divided by said grid. A flow sensor measures a flow rate of a fluid flowing through said flow channel, and a measured temperature value of the fluid, measured by said temperature measuring means, is used to correct a measured flow rate value of the fluid, measured by said flow sensor to produce a corrected flow rate.

Yet another aspect may be characterized as a mass flow controller comprising a flow channel through which a fluid flows, a temperature measuring means which has a temperature measuring point at a predetermined position inside said flow channel, and a temperature uniformalizing means disposed on an upstream side from said temperature measuring point in said flow channel. The temperature uniformalizing means comprises a grid constituted by periodically arranged partitions and disposed so as to continuously extend in two or more different arbitrary directions in a plane perpendicular to a direction in which a fluid flows, and sub flow channels divided by said grid. A flow sensor measures a flow rate of a fluid flowing through said flow channel, and a measured temperature value of the fluid, measured by said temperature measuring means, is used to correct a measured flow rate value of the fluid, measured by said flow sensor to produce a corrected flow rate. A flow control valve which controls a flow rate of the fluid flowing through said flow channel, and a controlling section to provide a control signal to said flow control valve such that the corrected flow rate becomes a predetermined target value.

DETAILED DESCRIPTION

Technical Problem

Figure 1:
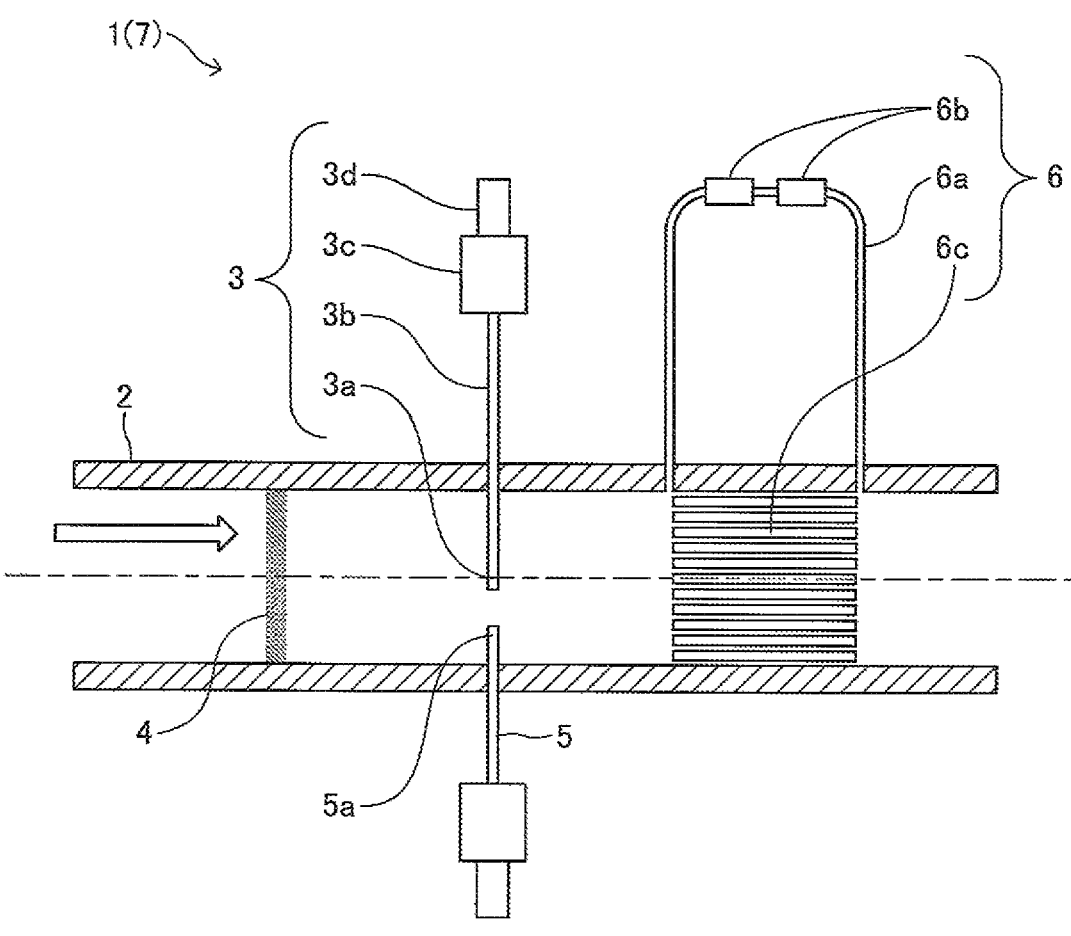
FIG. 1 is a cross sectional view for showing an example of a mass flow meter comprising a temperature sensor according to the present invention.

In reality, temperature of a gas may change for some causes. Since volume and pressure of a gas change in association with a change of temperature of the gas, a flow rate of the gas which a mass flow controller controls may deviate from a target value. Therefore, when a change arises in temperature of a gas supplied from an outside, it is preferable to detect it immediately and to adjust the flow rate. However, in the above-mentioned mass flow controller according to the conventional technology, since a temperature sensor is disposed in a main body block with large heat capacity or in a flow channel inside the main body block, even when temperature of a gas changes, it is difficult to make output of the temperature sensor immediately correspond to the changed temperature of the gas.

Then, it is considered that a temperature sensor which has small heat capacity and is thermally insulated from a main body block is disposed inside a gas flow channel of a mass flow controller. However, temperature at a position of a temperature measuring point of the temperature sensor does not necessarily reflect temperature of the gas supplied to the mass flow controller correctly even in this case. For example, when a cross section of the flow channel is circular, the gas which flows near a center of the flow channel is hardly affected by temperature of an inner wall of the flow channel, whereas the gas which flows near the inner wall is affected by temperature difference from the inner wall and temperature thereof is easily changed. Therefore, even when the temperature of the temperature measuring point close to the center of the flow channel is measured in order to avoid the influence of heat from the main body block, it cannot be said that the measured value is a measured value representing the temperature of the whole gas which flows through the flow channel (for example, average temperature of the gas over the entire cross section of the flow channel, etc.). Similar problems arise also in a case where temperature of a gas supplied to a mass flow controller is constant and temperature of a flow channel of the gas in the mass flow controller changed.

Aspects of the present invention were conceived in view of the above-mentioned problems, and one objective of the present invention is to acquire a measured temperature value representing temperature of the whole fluid supplied to a mass flow controller from the outside and raise accuracy of flow control by using the same.

Solution to Problem

A temperature sensor according to the present invention is a temperature sensor used for a mass flow meter, comprising a flow channel through which a fluid flows, a temperature measuring means which has a temperature measuring point at a predetermined position inside the flow channel, and a temperature uniformalizing means disposed on an upstream side from the temperature measuring point in the flow channel, wherein the temperature uniformalizing means comprises a grid disposed so as to continuously extend in arbitrary directions perpendicular to a direction in which a fluid flows, and sub flow channels divided by the grid.

In the temperature sensor comprising a configuration according to the present invention, vortexes of the fluid occur on a downstream side from the grid, and transfer of heat by convection takes place. Moreover, heat moves also by conduction inside of the continuous grid and conduction between the fluid flowing through the sub flow channels and the grid. In accordance with these actions possessed by the temperature uniformalizing means, as compared with a case where the temperature uniformalizing means is not disposed, the fluid with more uniform temperature distribution within the flow channel reaches the temperature measuring means on the downstream side.

In a temperature sensor according to a preferred embodiment of the present invention, the flow channel comprises a heating means. In other embodiments, the present invention are inventions of a mass flow meter or a mass flow controller comprising the above-mentioned temperature sensor.

Advantageous Effects of Invention

In accordance with the temperature sensor according to the present invention, a measured temperature value representing the temperature of the whole fluid flowing through a flow channel can be acquired. By using the acquired measured temperature value, as compared with conventional technologies, a measured flow rate value of a fluid flowing through a flow channel can be corrected more appropriately, and/or a flow rate thereof can be controlled in a higher accuracy by using the corrected measured flow rate value.

DESCRIPTION OF EMBODIMENTS

Embodiments for implementing the present invention will be explained below referring to drawings. The present invention is not limited to the embodiments which will be explained below. The present invention may be implemented in any embodiments unless they deviate from scope of technical ideas described in the specification, claims and drawings attached to the application.

A temperature sensor according to the present invention is a temperature sensor used for a mass flow meter, and comprises a flow channel, a temperature measuring means and a temperature uniformalizing means. FIG. 1 is a schematic view of a mass flowmeter 7 comprising a temperature sensor 1 according to the present invention. A flow channel 2 is a member through which a fluid flows. The flow channel 2 may be constituted by a tube having a predetermined thickness as exemplified in FIG. 1, or may be constituted by a block-shaped main body in which a hole is formed. An inner cross section of the flow channel 2 may be circular or any shapes other than the same. In the mass flowmeter 7 exemplified in FIG. 1, the flow channel 2 is constituted by a straight circular cylinder having a constant diameter. A one dot chain line passing through a center of the flow channel 2 indicates a central axis of the flow channel 2. In FIG. 1, a cross section of the mass flowmeter 7 cut by a plane including the central axis. An outlined arrow in FIG. 1 indicates a direction of a fluid flowing inside the flow channel 2.

The temperature measuring means 3 which the temperature sensor 1 according to the present invention comprises measures temperature of the fluid flowing through the flow channel 2. The temperature measuring means 3 has a temperature measuring point 3a at a predetermined position inside the flow channel 2. The temperature measurement point 3a is a position where the temperature of the fluid is measured in the temperature measurement means 3. The temperature measuring means 3 continuously carries out fixed point observation of the temperature of the fluid flowing through the flow channel 2, which changes moment by moment, at the temperature measuring point 3a fixed in the flow channel 2. Since the temperature measuring means 3 measures the temperature of the fluid in a pinpoint manner, when temperature distribution of the fluid inside the flow channel is uneven, a measured temperature value measured by the temperature measuring means 3 is not a measured value representative of the overall temperature of the fluid as it is. As mentioned above, the measured value representative of the overall temperature of the fluid is average temperature of a gas over an entire cross section of the flow channel and the like, for example.

As will be explained in detail later, in the temperature sensor 1 according to the present invention, the temperature uniformalizing means 4 makes the temperature distribution of the fluid in a radial direction of the flow channel more uniform. Therefore, even when the temperature measuring point 3a is located at a position other than a central part of the cross sectional of the flow channel 2, it is possible to acquire a measured value closer to a temperature measured value representing the overall temperature of the fluid flowing through the flow channel, as compared with a temperature sensor according to a conventional technology which does not comprise a temperature uniformalizing means 4. From such a viewpoint, the temperature measuring means 3 can have the temperature measuring point 3a at a predetermined position inside the flow channel 2. Moreover, as will be explained later, a plurality of temperature measuring points may be disposed in the temperature sensor 1 according to the present invention.

In an embodiment of the present invention, as exemplified in FIG. 1, the temperature measuring point 3a is located at a central part of the cross section of the flow channel 2, namely at a position close to the central axis of the flow channel 2. In the present invention, a "central part of the cross section of the flow channel" means a position which is close to the central axis of the flow channel 2 and is hardly affected by temperature change of the flow channel 2 due to being away from an inner wall of the flow channel 2. For example, the "central part of the cross section of the channel" can be defined as a region including a positional error which can occur when placing the temperature measurement point on the central axis of the flow channel 2. Therefore, the position of the temperature measurement point 3a needs not to perfectly coincide with the position of the central axis of the flow channel 2. The temperature measuring point 3a of the temperature sensor shown in FIG. 1 is located near a tip of a protecting tube 3b. The protecting tube 3b is fixed to the flow channel 2 such that the position of the temperature measurement point 3a is in the central part of the flow channel 2.

Since the protecting tube 3b is thin and has a small area of its cross section (cross sectional area), it is difficult for heat from the flow channel 2 to be conducted to the temperature measuring point 3a. Namely, the flow path 2 and the temperature measurement point 3a of the temperature measurement means 3 are thermally separated from each other. Therefore, the temperature measuring means 3 can measure temperature of the fluid without being affected by the temperature of the flow path 2. Moreover, by making wall thickness of the protecting tube 3b as thin as possible to reduce heat capacity of the temperature measuring means 3 including the temperature measuring point 3a, the temperature of the fluid measured by the temperature measuring means 3 can be made coincide with actual temperature change of the fluid in a short time.

Information on the temperature measured at the measuring point 3a of the temperature measuring means 3 is converted into an electrical signal, reaches a base 3c through lead wires in the protecting tube 3b, is transmitted to the outside of the temperature measuring means 3 through a connector 3d and a cable (not shown), and is converted into a measured temperature value there. As specific elements housed in the protecting tube 3b, for example, known temperature measuring elements such as resistance thermometers, thermistors and thermocouples, etc. can be used.

Figure 2:
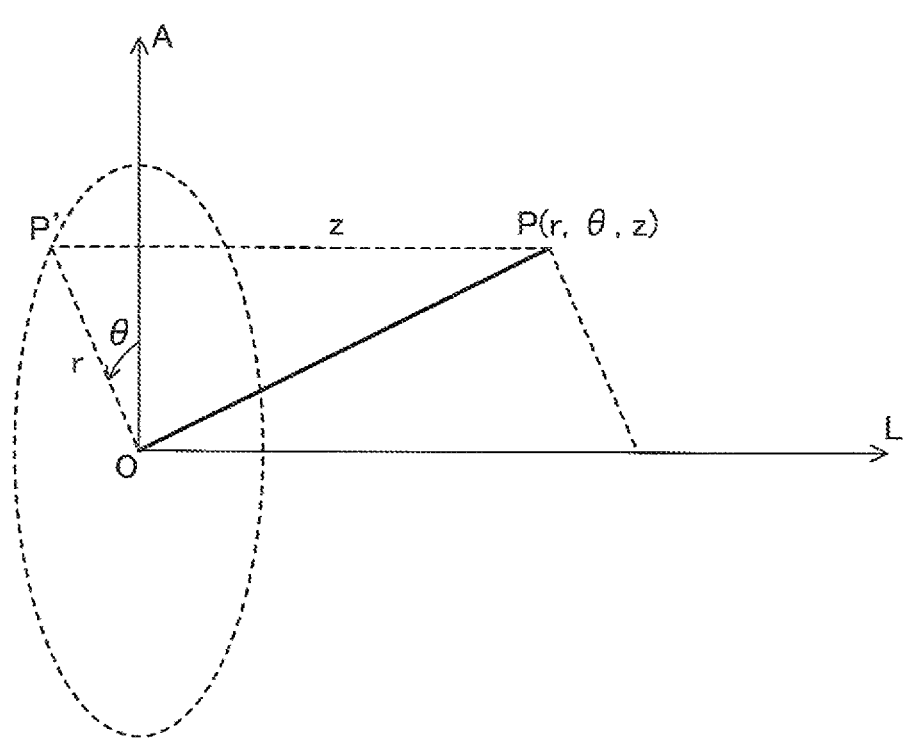
FIG. 2 is a conceptual diagram for showing a cylindrical coordinate system which can be applied to a flow channel.

In order to make the following explanation easy, a cylindrical coordinate system which can be applied to the flow channel 2 according to the present invention will be explained here referring to FIG. 2. In FIG. 2, O is an origin of the cylindrical coordinate system. The origin O can be located at any position on the central axis of the flow channel 2 shown in FIG. 1, for example, at an upstream end of the flow channel 2.

An axis L extending from the origin O to the right hand side in FIG. 2 is referred to as a cylindrical axis. A position of the cylindrical axis L coincides with the position of the central axis of the flow channel 2. A positive direction of the cylindrical axis L coincides with a direction from upstream to downstream of the flow channel 2. An axis A extending from the origin O upward in FIG. 2 is referred to as a polar axis. A direction of the polar axis A determines a reference direction in a plane perpendicular to the cylindrical axis L of the cylinder coordinate system. The direction of the polar axis A can be determined so as to coincide with a vertical direction in FIG. 1, for example. In the example shown in FIG. 1, since the protecting tube 3b is disposed in the vertical direction, the direction of the polar axis A coincides with the direction in which the protecting tube 3b is disposed. A positive direction of the polar axis A can be determined to coincide with the direction from a lower side to an upper side in FIG. 1.

A position of an arbitrary point P in the cylindrical coordinate system can be expressed as P(r, θ, z) using three coordinates r, θ and z. r is referred to as a radial coordinate and is distance between the origin O and a point P'(r, θ, 0) which is a projection of the point P onto a plane including the origin O and perpendicular to the cylindrical axis L. θ is referred to as an azimuth angle and is an angle between the polar axis A and a line segment OP'. z is referred to as height and is distance between the point P and a plane including the origin O and perpendicular to the cylindrical axis L.

Referring again to FIG. 1, the temperature sensor 1 according to the present invention comprises the temperature uniformalizing means 4 disposed on an upstream side from the temperature measuring point 3a in the flow channel 2. The temperature uniformalizing means 4 comprises a grid 4a (not shown) disposed so as to continuously extend in arbitrary directions perpendicular to a direction in which the fluid flows, and sub flow channels 4b (not shown) divided by the grid 4a. In the present invention, the "grid" refers to periodically arranged partitions. In temperature uniformalizing means 4, the flow channel 2 is divided into a number of sub flow channels 4b by the grid 4a. Namely, the grid 4a constitutes walls of the sub flow channels 4b, and spaces between the grids 4a constitute the sub flow channels 4b.

A flow of the fluid which reached the temperature uniformalizing means 4 through the flow channel 2 is divided by the grid 4a into flows which flow inside a number of the sub flow channels 4b. The sub flow channels 4b connect the upstream and downstream sides of the temperature uniformalizing means 4. The sub flow channel 4b may connect an entrance on the upstream side and an exit on the downstream side of the temperature uniformalizing means 4 through a single flow channel, or a number of the sub flow channels 4b may join and/or branch again inside the temperature uniformalizing means 4. Since the fluid which flows out to the downstream side of the sub flow channels 4b loses the partitions, its entire joins again to form a flow inside the flow channel 2.

The grid 4a is disposed so as to continuously extend in arbitrary directions perpendicular to a direction in which the fluid flows. Referring to FIG. 2, the direction in which the fluid flows is a positive direction of the cylindrical axis L. The arbitrary directions perpendicular to the direction in which the fluid flows are directions of vectors OP' at arbitrary azimuthal angles θ. Namely, the grid 4a is disposed so as to continuously extend in arbitrary directions perpendicular to a direction in which the fluid flows. In the present invention, "the grid 4a is disposed so as to continuously extend" means that the members constituting the grid 4a are disposed uninterruptedly throughout the entire temperature uniformalizing means 4a, except for parts of the sub flow channels 4b. Embodiments of the grid 4a will be mentioned later in detail.

Figure 3:
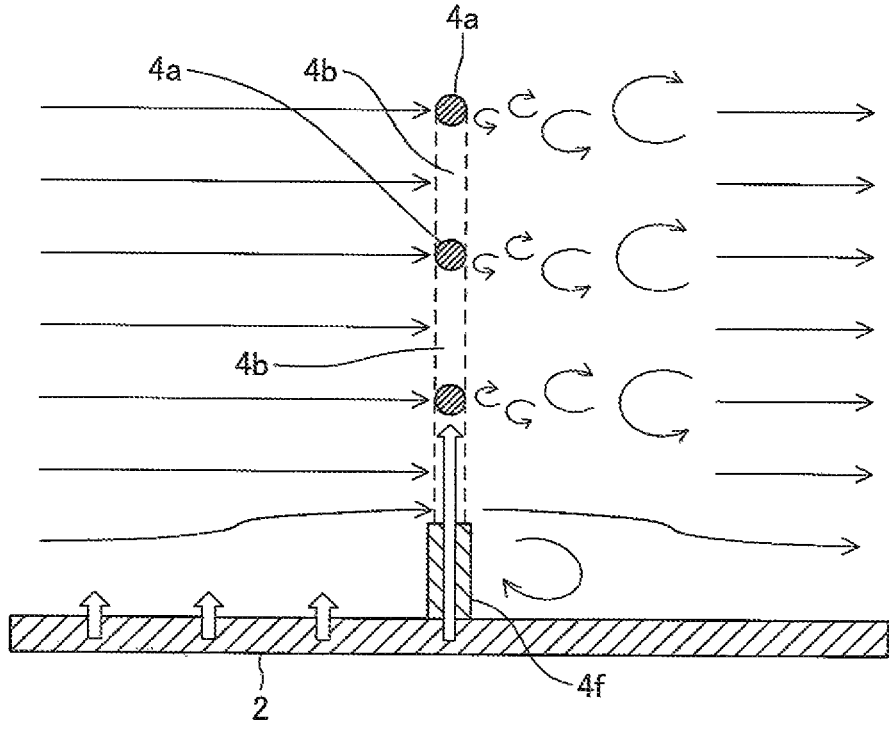
FIG. 3 is a cross sectional view for showing actions of a temperature uniformalizing means which the temperature sensor according to the present invention comprises.

Next, actions of the temperature uniformalizing means 4 which the temperature sensor 1 according to the present invention comprises will be explained. FIG. 3 is a cross sectional view for showing actions of the temperature uniformalizing means 4. The grid 4a of the temperature uniformalizing means 4 exemplified in FIG. 3 is constituted by mesh woven with wires. The circular cross sections close to a center of FIG. 3 represent cross sections of weft threads constituting the mesh. Broken lines extending in a vertical direction represent positions of warp threads constituting the mesh. The temperature uniformalizing means 4 is constituted by plain weave mesh disposed continuously in arbitrary directions perpendicular to the direction in which the fluid flows. Spaces between the grids 4a constitute the sub flow channels 4b.

The fluid flows in the flow channel 2 from left to right in FIG. 3. The fluid which reached the temperature uniformalizing means 4 is divided into a number of sub flow channels 4b, passes through the temperature uniformalizing means 4, and thereafter joins again. At this time, the fluid whose flow is obstructed by the grid 4a turns around to form vortexes at a position corresponding to a rear side of the grid 4a when viewing from the upstream side of the flow channel 2. Although the size of the vortex generated at a position closest to the grid 4a is smaller than the size of the grid 4a, the size of a vortex formed at a more distant position may be larger than the size of the grid 4a. Although not shown in FIG. 3, vortexes are generated also behind the warp threads of the mesh.

On the left side than the temperature uniformalizing means 4 in FIG. 3, the fluid flowing in the flow channel 2 flows orderly at approximately uniform velocity. This is a state of so-called laminar flow. When flow is laminar flow and there are no objects which obstruct the flow in a flow channel, since there is no mass transfer in directions perpendicular to a direction in which the fluid flows, heat transfer hardly occurs. On the right side than the temperature uniformalizing means 4 in FIG. 3, turbulence is caused by the existence of the grid 4a in the flow of the fluid after passing through the temperature uniformalizing means 4, and vortexes due to a difference in velocity are generated. In particular, when the fluid is a gas, the velocity difference is easier to be maintained since its viscosity is smaller than that of a liquid, and vortexes are more likely to be generated. When a vortex is generated, since mass movement occurs in the direction perpendicular to the direction in which the fluid flows, transfer of heat by convection occurs in a direction perpendicular to the flow. The vortexes generated on the downstream side of the grid 4a dissipate at a location distant on the downstream side from the grid 4a. After the vortexes dissipate, mass transfer in the direction perpendicular to the direction in which the fluid flows ceases again.

Generation status of vortexes by the grid 4a changes depending on the Reynolds number. The Reynolds number in the grid 4a shown in FIG. 3 is defined as a dimensionless number obtained by dividing the product of flow velocity of the fluid and a diameter of the grid 4a by a kinematic viscosity coefficient of the fluid. When the Reynolds number is less than 40, the vortex generated behind the grid 4a is a steady flow which does not change with time. When the Reynolds number exceeds 40, vortexes are generated one after another and are swept backward as exemplified in FIG. 3, and a so-called Kalman vortex street is generated. This is a flow which changes regularly at a predetermined period. Furthermore, when the Reynolds number exceeds 500, the flow changes irregularly with time and becomes and a so-called turbulent flow which is also spatially turbulent. When a turbulent flow occurs, the fluid is intensely mixed and heat exchange is accelerated.

The temperature uniformalizing means 4 is effective not only in facilitating transfer of heat by convection, but also transfer of heat by conduction. As mentioned above, the grid 4a is disposed so as to continuously extend in arbitrary directions perpendicular to the direction in which the fluid flows. For example, in the grid 4a constituted by the mesh exemplified in FIG. 3, due to thermal conduction by the wires constituting the mesh, heat can be transferred in directions perpendicular to the direction in which the fluid flows in the temperature uniformalizing means 4. Heat moves not only from a certain part of the grid 4a to another part, but also between the flow channel 2 and the grid 4a, as shown by a long outlined arrow in FIG. 3.

Figure 4:
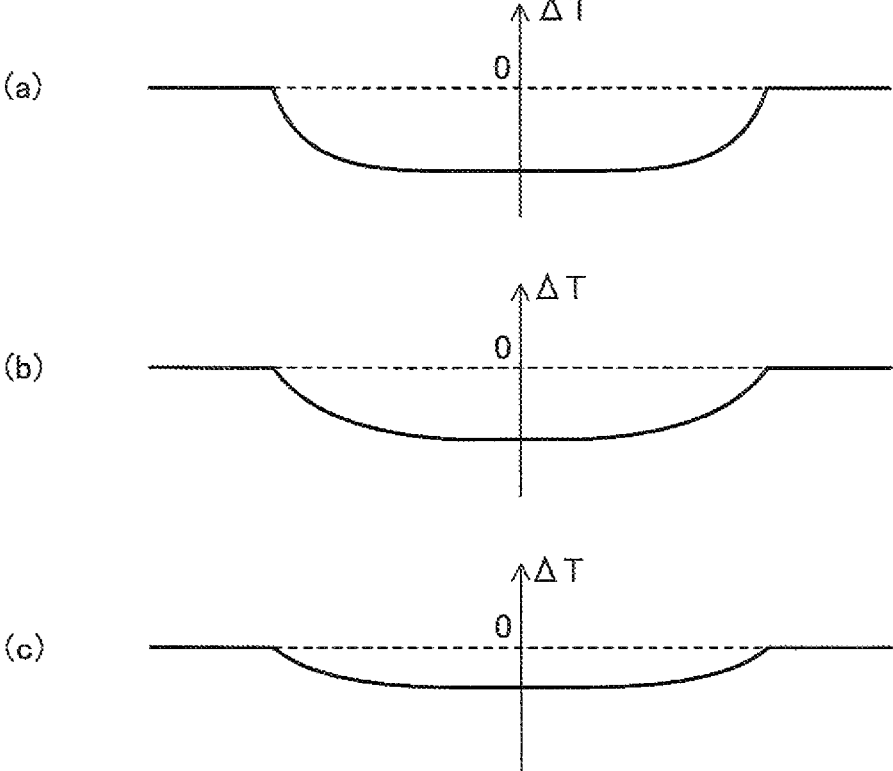
FIG. 4 is a schematic diagram for showing an example of temperature distribution of a fluid flowing through a flow channel of the temperature sensor according to the present invention.

Next, effects attained by the temperature uniformalizing means 4 which the temperature sensor 1 according to the present invention comprises will be explained. FIG. 4 is a schematic diagram for showing an example of temperature distribution of the fluid flowing through the flow channel 2 of the temperature sensor 1 according to the present invention. In FIG. 4, assuming that the temperature of the flow channel 2 is kept constant, temperature distribution of a fluid when a fluid having lower temperature than the temperature of the flow channel 2 flows into flow channel 2 is represented by temperature difference ΔT on the basis of the temperature of the flow channel 2. Both of left and right ends of graphs represent the temperature of an inner wall of the flow channel 2, and central parts of the graphs represent distribution of the temperature of the fluid flowing in the flow channel 2 with respect to the radial coordinate r. Centers of the graphs represent the temperature difference ΔT at the central area of the flow channel 2.

FIG. 4(*a*) is a graph for showing the temperature distribution of the fluid in a radial direction of the flow channel 2 just before the fluid reaches the temperature uniformalizing means 4. Since the fluid flowing near the central part of the flow channel 2 is hardly affected by the temperature of the flow channel 2, the low temperature immediately after entering the flow channel 2 is maintained. Heat is transferred by conduction from the flow channel 2 to the fluid flowing at a position close to the inner wall of the flow channel 2, due to the temperature difference between the fluid and the flow channel 2, as indicated by short outlined arrows in FIG. 3. Since the velocity of the fluid slows down due to frictional resistance at a position close to the inner wall of the fluid flow channel 2, heat is accumulated in the fluid while flowing through the fluid flow channel 2. As a result, as shown in FIG. 4(*a*), the temperature distribution of the fluid becomes temperature distribution in which the temperature of the fluid at the position in contact with the inner wall of the flow channel 2 remains the same as the temperature of the flow channel 2, the temperature drops rapidly as it moves away from the inner wall of the flow channel 2, and the temperature distribution close to the central part is low and flat.

FIG. 4(*b*) is a graph for showing the temperature distribution of the fluid immediately after passing through the temperature uniformalizing means 4. As mentioned above, the grid 4*a* constituting the temperature uniformalizing means 4 can transfer heat inside by conduction. The temperature of the grid 4*a* at positions close to the flow channel 2 is heated up to the same temperature as that of the flow channel 2 by continued contact with the fluid having the temperature distribution shown in FIG. 4(*a*). On the other hand, the temperature close to the central part of the grid 4*a* remains low. Then, due to the temperature difference inside the grid 4*a*, heat transfer by conduction occurs from an outer periphery to the center of the grid 4*a*, and the temperature of the grid 4*a* becomes higher than the temperature of the fluid in contact with the grid 4*a*. Then, heat is supplied from the hot grid 4*a* toward the cooler fluid passing through the sub flow channels 4*b* which are spaces in the grid 4*a*. As a result, as shown in FIG. 4(*b*), the temperature distribution of the fluid at positions close to the inner wall of the flow channel 2 becomes more gently sloping than that in (a). The temperature of the fluid close to the central part of the fluid is slightly higher than that in (a).

FIG. 4(*c*) is a graph for showing the temperature distribution of the fluid when reaching the temperature measuring means 3 after passing through the temperature uniformalizing means 4. As mentioned above, the temperature uniformalizing means 4 facilitates transfer of heat by convection. In particular, when a Kalman vortex street or turbulence is occurring, vortexes are generated not only behind the grid 4*a*, but also behind the sub flow channels 4*b*, as shown in FIG. 3. Then, in a time period from the state immediately after passing through the temperature uniformalizing means 4 until the vortexes disappear and the flow returns to a steady flow, heat transfer by convection occurs in the directions perpendicular to the direction in which the fluid flows. As a result, as shown in FIG. 4(*c*), the temperature distribution upon arrival at the temperature measuring means 3 becomes even smoother than in (b). Moreover, the temperature of the fluid close to the central part becomes further more gently sloping than that in (b), and the temperature difference ΔT from the flow channel 2 becomes smaller.

In the above explanation, the actions and effects of the temperature uniformalizing means 4 in a case where the temperature of the fluid is lower than the temperature of the flow channel 2 has been explained. However, even when the temperature of the fluid is higher than the temperature of the flow channel 2 on the contrary, the temperature uniformalizing means 4 in the present invention exhibits exactly the same actions and effects except that direction of heat transfer is opposite to that in FIG. 3 and FIG. 4.

In an embodiment of the present invention, the flow channel 2 comprises a heating means. As mentioned above, when handling a gas while maintaining temperature higher than room temperature for the purpose of preventing liquefaction of the gas in the flow channel, it is preferable to ensure that all components, with which the gas contacts, including the flow channel 2, comprise heating means to hold those components at high temperature. However, a part of those members may lack heating means for structural reasons, for example.

The heating means which the flow channel 2 comprises can be constituted by a heater disposed around the flow channel 2, for example. Alternatively, a heat insulator covering the flow channel 2 may be disposed in place of a heater, or both a heater and heat insulator may be disposed.

Figure 5:
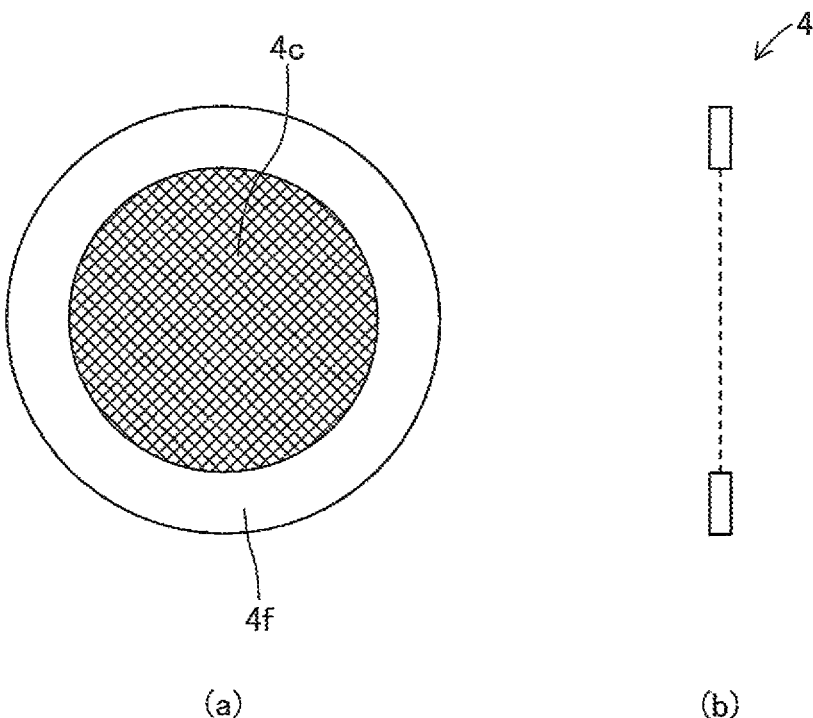
FIG. 5 is a schematic diagram for showing a working example of a temperature uniformalizing means which the temperature sensor according to the present invention comprises.

In an embodiment of the present invention, the grid 4*a* is constituted by mesh 4*c* is woven with wires formed of metal or alloy. FIG. 5 is a schematic diagram for showing a working example of the temperature uniformalizing means 4 which the temperature sensor 1 according to the present invention comprises to exemplify a front view (a) and a side view (b) of the temperature uniformalizing means 4 constituted by the mesh 4*c*. An annular member 4*f* shown in FIG. 5 will be mentioned later. A wire formed of metal or alloy is preferred as a member constituting the temperature uniformalizing means 4 since it has excellent thermal conductivity and sufficient strength even when it is thin. As the metal or alloy constituting the mesh 4*c*, it is preferable to use those which is not corroded when it is in contact with a fluid and has excellent thermal conductivity. Specifically, wires formed of gold, nickel, stainless steel, or the like can be adopted.

As a weaving method of the mesh 4*c*, a plain weave or any other known weaving method can be adopted. In the mesh 4*c* woven with wires, since heat transfer by conduction is possible at parts where the wires are in contact with each other, the mesh 4*c* is disposed without interruption throughout the entire temperature uniformalizing means 4. Accordingly, it can be said that the grid 4*a* constituted by the mesh 4*c* is disposed so as to continuously extend in arbitrary directions perpendicular to the direction in which the fluid flows. In order to ensure more reliable conduction of heat, contact points between the wires may be robustly connected by means of diffusion bonding, welding or brazing, etc. Moreover, the grid 4*a* may be constituted by overlapping a plurality of the meshes 4*c* in a thickness direction.

A diameter of the wires constituting the mesh 4*c* can be determined by taking the above-mentioned Reynolds number and heat transfer into consideration. For example, in a case where a flow rate of a gas is 5.0 standard liter per minute and a diameter of the flow channel 2 is 8.0 mm, the cross sectional area necessary for heat conduction can be ensured and generation of vortexes can be facilitated when a diameter of the wire is 0.20 mm or more. When the diameter of the wire is 2.0 mm or less, an opening of the mesh 4c can be ensured and the number of the wires installed per unit cross sectional area of the flow channel 2 can be ensured. Therefore, it is preferable that the diameter of the wires at the above-mentioned flow rate is 0.20 mm or more and 2.0 mm or less. More preferred diameter of the wires is 0.50 mm or more and 1.5 mm or less.

When the opening of the mesh 4c, namely interval of the grid 4a, is 0.10 mm or more, the sub flow channel 4b can be ensured to be large enough for lowering pressure loss. When the opening of the mesh 4c is 1.0 mm or less, generation of vortexes can be facilitated. Accordingly, it is preferable that the opening of the mesh is 0.10 mm or more and 1.0 mm or less. More preferred opening of the mesh 4c is 0.2 mm or more and 0.8 mm or less.

It is preferable that the flow channel 2 and the grid 4a constituted by the mesh 4c are fixed such that heat from the flow channel 2 is easily conducted to the grid 4a. Thereby, as shown by a long outlined arrow in FIG. 3, effects of facilitating flow of heat from the flow channel 2 to the grid 4a or flow of heat in an opposite direction and making the temperature distribution of the fluid more uniform are provided.

Figure 6:
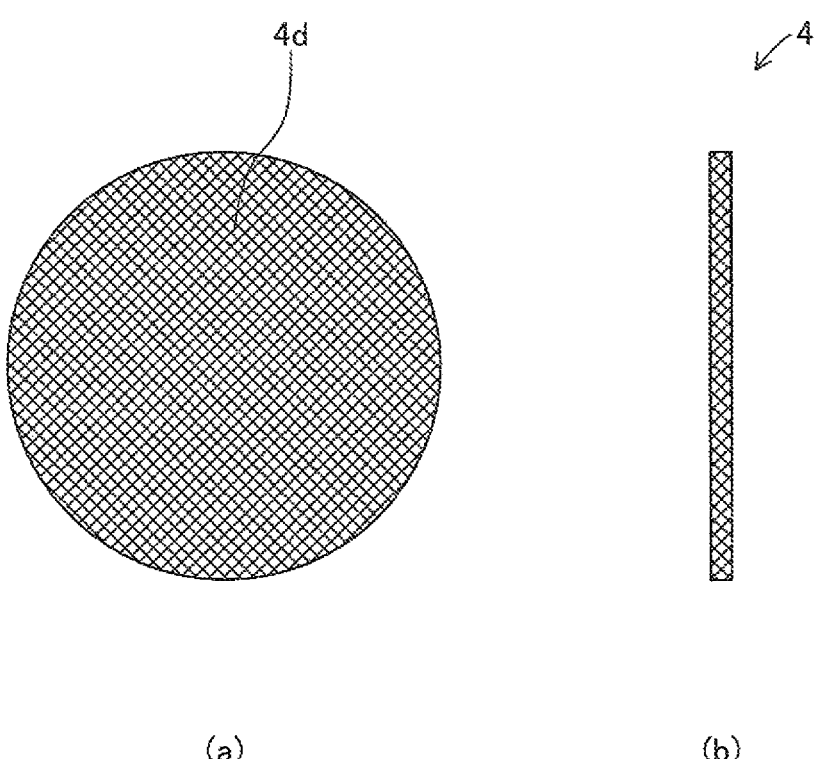
FIG. 6 is a schematic diagram for showing another working example of a temperature uniformalizing means which the temperature sensor according to the present invention comprises.

In an embodiment of the present invention, the grid 4a is constituted by a porous object 4d formed of metal or alloy. FIG. 6 is a schematic diagram for showing another working example of the temperature uniformalizing means 4 which the temperature sensor 1 according to the present invention comprises, and exemplifies a front view (a) and a side view (b) of the temperature uniformalizing means 4 constituted by the porous object 4d. Although the porous object 4d formed of metal or alloy is obtained by sintering particulate objects formed of metal or alloy, for example, a method for producing the porous object 4d is not limited to sintering, and the porous object 4d can be produced by various methods. The porous object 4d formed of metal or alloy has excellent thermal conductivity and sufficient strength and is therefore preferred as a member constituting the temperature uniformalizing means 4. As the metal or alloy constituting the porous object 4d, it is preferable to use those which is not corroded when it is in contact with a fluid and has excellent thermal conductivity. Specifically, stainless steel or the like can be adopted.

In the porous object 4d obtained by sintering particulate objects formed of metal or alloy, since sintering necks formed at parts where the particulate objects in contact with each other allow heat transfer by conduction, the porous object 4d is disposed without interruption throughout the entire temperature uniformalizing means 4. Accordingly, it can be said that the grid 4a constituted by the porous object 4d is disposed so as to continuously extend in arbitrary directions perpendicular to the direction in which the fluid flows. Moreover, the sub flow channels 4b continuous inside the porous object 4d can be formed by adjusting the size and degree of sintering of the particulate objects. A plurality of the sub flow channels 4b penetrate from one surface to the other surface of the porous object 4d while joining and/or branching again inside the temperature uniformalizing means 4. Since the particulate objects constituting the porous object 4d is indefinite in their shapes and have rougher surfaces than that of wires, it is easier to generate turbulence of the fluid when the porous object 4d is used as the temperature uniformalizing means 4.

When a diameter of the particulate objects constituting the porous object 4d is 200 μm or more, the opening of the mesh of the porous object 4d can be ensured and generation of vortexes can be facilitated. When the diameter of the particulate objects is 500 μm or less, contact area between the particulate objects necessary for heat conduction can be ensured. Accordingly, it is preferable that the diameter of the particulate objects is 200 μm or more and 500 μm or less. More preferred diameter is 250 μm or more and 400 μm or less. As in the case of the mesh 4c, it is preferable that the flow channel 2 and the grid 4a constituted by the porous object 4d are fixed such that heat from the flow channel 2 is easily conducted to the grid 4a.

Figure 7:
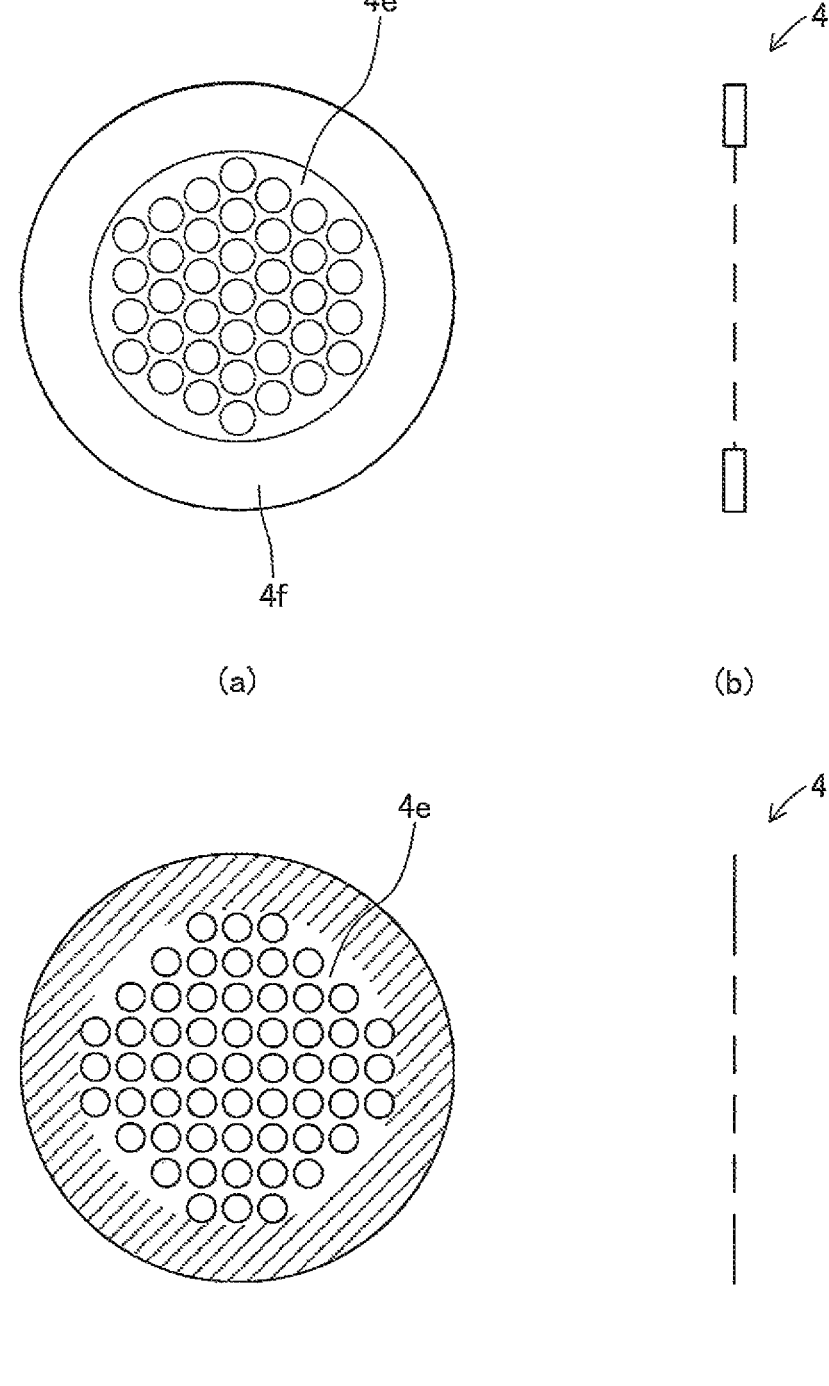
FIG. 7 is a schematic diagram for showing another working example of a temperature uniformalizing means which the temperature sensor according to the present invention comprises.

In an embodiment of the present invention, the grid 4a is constituted by a perforated metal formed of metal or alloy. As well known to those skilled in the art, a perforated metal is a flat plate made of metal in which a plurality of through holes are perforated. FIG. 7 is a schematic diagram for showing two working examples of the temperature uniformalizing means 4 constituted by perforated metals 4e. (a) and (b) are front and side views of the temperature uniformalizing means 4 comprising the annular member 4f which will be mentioned later, and (c) and (d) are front and side views of the temperature uniformalizing means 4 without the annular member 4f. A perforated metal formed of metal or alloy is preferred as a member constituting the temperature uniformalizing means 4 since it has excellent thermal conductivity and sufficient strength even when it is thin. Moreover, as shown in (c) and (d), it is also possible to make a peripheral part (shaded area) of the perforated metal 4e function as the annular member 4f by drilling no through hole in the peripheral part of the perforated metal 4e. As the metal or alloy constituting the perforated metal 4e, it is preferable to use those which is not corroded when it is in contact with a fluid and has excellent thermal conductivity. Specifically, a flat plate formed of gold, nickel, stainless steel, or the like, with a plurality of though holes drilled therein can be adopted.

In the perforated metal 4e, since heat transfer by conduction is possible throughout the perforated metal 4e except for parts with a through hole drilled therein, the perforated metal 4e is disposed without interruption throughout the entire temperature uniformalizing means 4. Accordingly, it can be said that the grid 4a constituted by the perforated metal 4e is disposed so as to continuously extend in arbitrary directions perpendicular to the direction in which the fluid flows. The grid 4a may be constituted by overlapping a plurality of the perforated metals 4e in a thickness direction.

Specific configuration of the perforated metal 4e, such as interval (pitch) between through holes, number of through holes per unit area and size of individual through holes in the perforated metal 4e, can be properly determined taking into consideration, for example, ensuring cross sectional area necessary for heat conduction, facilitating generation of vortex on a downstream side and restraining excessive increases in pressure loss. It is preferable that the flow channel 2 and the grid 4a constituted by the perforated metal 4e are fixed such that heat from the flow channel 2 is easily conducted to the grid 4a. Thereby, as shown by a long outlined arrow in FIG. 3, effects of facilitating flow of heat from the flow channel 2 to the grid 4a or flow of heat in an opposite direction and making the temperature distribution of the fluid more uniform are provided.

In an embodiment of the present invention, the temperature uniformalizing means 4 includes the annular member 4f which obstructs the flow of the fluid close to the inner wall of the flow channel 2. The temperature uniformalizing means 4 constituted by the mesh 4c exemplified in FIG. 5 comprises the annular member 4f in a periphery of the mesh 4c. The annular member 4f can be constituted by a dough-nut-shaped member constituted by a flat plate formed of metal or alloy and having a through hole in its central area, for example. Coupling of the mesh 4*c* and the annular member 4*f* can be achieved by preparing two annular members 4*f* having an identical shape, interposing and fixing the mesh 4*c* between them. When the temperature uniformalizing means 4 comprises the annular member 4*f*, transfer of heat from the flow channel 2 to the grid 4*a* takes place through the annular member 4*f*. Therefore, it is preferable that the grid 4*a* constituted by mesh 4*c* or the like and the annular member 4*f* disposed in its periphery are fixed such that transfer of heat between them is easy.

As shown in FIG. 3, the annular member 4*f* acts to obstruct the flow of the fluid close to the inner wall of the flow channel 2 in the temperature uniformalizing means 4. The flow of the fluid obstructed by the annular member 4*f* flows out to the downstream side through the sub flow channel 4*b* closest to the annular member 4*f*. Thereby, the fluid heated or cooled while flowing near the inner wall of the flow channel 2 is mixed with the fluid flowing near the central part of the flow channel 2, while changing its flow direction significantly. As a result, deviation of the temperature distribution of the fluid is reduced. In any of the above-mentioned embodiments of the mesh 4*c*, the porous object 4*d* and the perforated metal 4*e*, which are embodiments of the temperature uniformalizing means 4, the annular member 4*f* can be disposed.

Moreover, as shown in FIG. 3, at least a part of the fluid after passing through the through hole of the annular member 4*f* forms a large vortex which spreads outward in the radial direction of the flow channel 2 from the through hole of the annular member 4*f* and turns around in a direction to the annular member 4*f*, behind the annular member 4*f*. Thereby, the fluid flowing near the inner wall of the flow channel 2 is agitated again, and the deviation of the temperature distribution of the fluid is further reduced.

In an embodiment of the present invention, the temperature sensor 1 comprises a second temperature measuring means 5 which has a temperature measuring point at a position other than the central part inside the flow channel 2. In this embodiment, in order to distinguish it from the second temperature measuring means 5, the originally existing temperature measuring means will be referred to as the first temperature measuring means 3. As exemplified in FIG. 1, both of the temperature measurement point 3*a* of the first temperature measurement means 3 and a temperature measurement point 5*a* of the second temperature measurement means 5 are located on the same plane perpendicular to the direction in which the fluid flows. In this configuration, the first temperature measuring means 3 and the second temperature measuring means 5 measure the temperature of the fluid at two different positions on the same plane perpendicular to the direction in which the fluid flows, exemplified in FIG. 1, at the same position in the flow channel 2. Thereby, temperature distribution of the fluid as exemplified in FIG. 4 can be inferred to perceive the temperature of the fluid more accurately.

In another embodiment of the present invention, the present invention is an invention of a mass flowmeter 7 which comprises the temperature sensor 1 according to the present invention and a flow sensor 6 to measure a flow rate of the fluid flowing through the flow channel 2 and corrects a measured flow rate value of the fluid measured by the flow sensor 6 using a measured temperature value of the fluid measured by the temperature sensor 1. Since the temperature of the fluid can be accurately by the temperature sensor 1 according to the present invention, the mass flowmeter 7 which can carry out flow rate measurement with higher accuracy as compared with conventional technologies. As shown in FIG. 1, the flow sensor 6 can be constituted as a known thermal flow sensor which comprises a branch pipe 6*a* which diverges from the flow channel 2 and thereafter joins, a pair of temperature measuring elements 6*b* disposed in the branch pipe 6*a*, and a bypass 6*c* disposed in the flow channel 2, for example. As the flow sensor 6, known flow sensors other than a thermal flow sensor, such as a pressure flow sensor, for example, can be adopted, as long as they do not interfere with the effects of the present invention.

In further another embodiment of the present invention, the present invention is an invention of a mass flow control device 8 comprising the mass flow meter 7 according to the present invention, a flow control valve which controls a flow rate of the fluid flowing through the flow channel 2, and a controlling section which provide a control signal to the flow control valve such that a measured flow rate value of the fluid measured by the mass flow meter 7 becomes a predetermined target value. By using the flow measured value provided by the mass flowmeter 7 according to the present invention, it is possible to realize the mass flow control device 8 which can control the flow rate with higher accuracy as compared with conventional technologies.

Working Example

Figure 8:
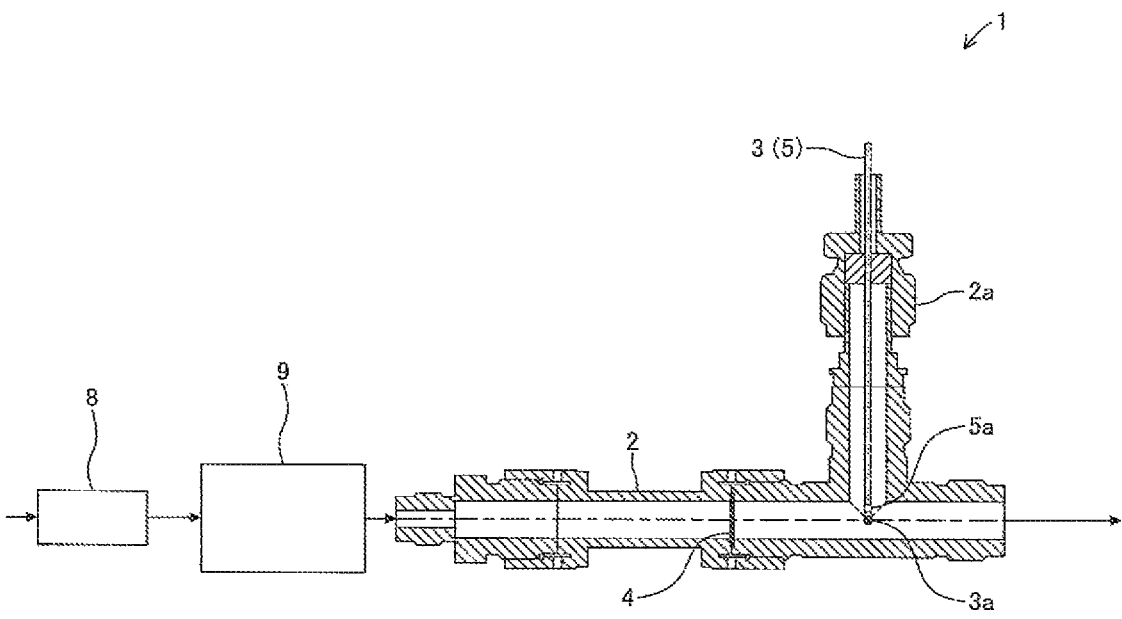
FIG. 8 is a cross sectional view for showing a configuration of a temperature sensor according to a working example of the present invention.

Effects achieved by the present invention will be exemplified below using a working example. First, as shown in FIG. 8, a temperature sensor 1 comprising a flow channel 2, a first temperature measuring means 3, and a temperature uniformalizing means 4 was prepared as a temperature sensor according to the working example. The temperature sensor 1 shown in FIG. 8 has the same configuration as the temperature sensor 1 shown in FIG. 1, except that it does not comprise the flow sensor 6. As the first temperature measuring means 3, a sheath-type temperature sensor with a built-in alumel-chromel thermocouple and an outer diameter of 1.2 mm was used. A position of the measuring point 3*a* of the first temperature measuring means 3 was set at the center of the flow channel 2 (first temperature measuring point) (refer to a black circle in the drawing). Error in an actual position of the first temperature measurement point with respect to the center of the flow channel 2 as a target was within a range of ±1.0 mm. Moreover, for the purpose of eliminating heat conduction from the flow channel 2, a root end of the first temperature measuring means 3 was fixed to a closed tip of the piping diverging from the flow channel 2 (branch pipe 2*a*).

The temperature uniformalizing means 4 constituted by the mesh 4*c* shown in FIG. 5 was used. As the mesh 4*c*, plain-woven stainless steel wire having a diameter of 0.8 mm was used. Distance between center axes of the steel wires was 1.8 mm. An inner diameter of an annular member 4*f* which fixes the mesh 4*c* was 11.2 mm. Distance between a position of the temperature uniformalizing means 4 and a position of the first temperature measuring means 3 on the central axis of the flow channel 2 was 36.8 mm.

Nitrogen gas with an absolute pressure of 0.12 MPa and a gauge pressure of 0.02 MPa was supplied from a nitrogen gas cylinder (not shown) through a mass flow controller (MFC) 8 to an inlet of a gas-heating heater 9 at a flow rate of 6.0 standard liter per minute (slm), and nitrogen gas with a pressure of 0.1 MPa flowing out of an outlet of the gas-heating heater 9 was supplied to an upstream side of the flow channel 2. A gas-heating heater (model number: WEX-S1-2U) manufactured by Watty Corporation was used as the gas-heating heater 9. Temperature measurement by the first temperature measuring means 3 was started at the same time as heating of nitrogen gas was started by the gas-heating heater 9 with a temperature setting of 150° C., and the measurement was continued for approximately 30 minutes.

Next, the gas-heating heater 9 was turned off, and supply of nitrogen gas was stopped after waiting for the flow channel 2 to be cooled down to room temperature. The position of the temperature measurement point of the above-mentioned sheath-type temperature sensor was changed to a position shifted outward by 3.0 mm from the center of the flow channel (second temperature measurement point 5a) to constitute the second temperature measurement means 5 (refer to an outlined circle in the drawing). Then, measurement was continued for approximately 30 minutes under the same conditions as those of the above-mentioned temperature measurement by the first temperature measuring means 3. Results of these two temperature measurements are shown by graphs in solid lines in FIG. 9.

On the other hand, a temperature sensor in which only the temperature uniformalizing means 4 was removed from the above-mentioned temperature sensor 1 according to the working example was used as a temperature sensor according to a comparative example to continue temperature measurements at the above-mentioned first and second temperature measuring points for approximately 30 minutes, respectively. Results of these two temperature measurements are shown by graphs in dashed lines in FIG. 9.

Figure 9:
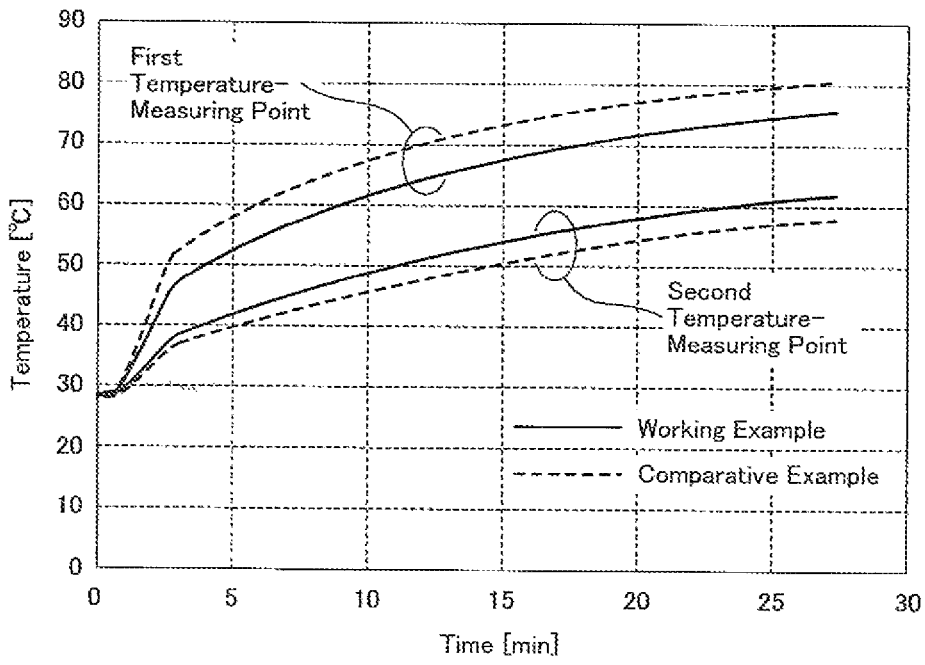
FIG. 9 is a graphic chart for showing results of temperature measurements at a first temperature measuring point and a second temperature measuring point by a temperature sensor according to a working example of the present invention and a temperature sensor according to a comparative example.

In accordance with data of the working example and comparative example shown in FIG. 9, the temperature of nitrogen gas rises rapidly from the start of the temperature measurement, and the temperature rise becomes slightly slower after about two and a half minutes have elapsed. This is because temperature of the gas-heating heater 9 reached 150° C. that is set temperature. Comparing the temperature at the first measuring point 3a (center of the flow channel 2) and the temperature at the second measuring point 5a (3.0 mm from the center), the temperature difference between the two in the comparative example which does not comprise the temperature uniformalizing means 4 exceeds about 20° C., while the temperature difference in the working example which comprises the temperature uniformalizing means 4 remains about 15° C.

From this data, it can be seen that, in the temperature sensor 1 according to the present invention which comprises the temperature uniformalizing means 4, the temperature at the first measuring point 3a (center of the flow channel 2) is lower while the temperature at the second measuring point 5a (3.0 mm from the center) is higher, resulting in a more uniform temperature distribution in the radial direction of the flow channel than that in conventional technologies.

Considering the action of the temperature uniformalizing means 4 constituted by the mesh 4c in the working example, from a fact that the diameter of the steel wire constituting this mesh 4c is 0.8 mm and the viscosity, density and velocity of nitrogen gas, the Reynolds number is estimated to be approximately 69 when the diameter of the steel wire is used as a representative length under the conditions in the working example. Since this value is greater than 40 and less than 500, it can be inferred that a Kalman vortex street is generated whereas no turbulence is generated on a down-stream side of the temperature uniformalizing means 4. A Kalman vortex street is a flow which changes regularly at a predetermined period. Thereby, a component in a direction perpendicular to the central axis of the flow channel 2 (radial direction of the flow channel 2) occurs in the flow of nitrogen gas, and mass movement occurs in this direction. As a result, it is considered that heat transfer by convection in the direction perpendicular to the flow occurs, and the temperature distribution becomes uniform.

Moreover, by measuring temperature at the outside of the flow channel 2 in which the temperature uniformalizing means 4 is disposed in the working example in association with the above-mentioned temperature measurements at the first measuring point 3a and the second measuring point 5a, it was found that the temperature was 2 to 3° C. higher than that in a case of the comparative example in which the temperature uniformalizing means 4 was not disposed. This fact suggests that the mesh 4c constituting the temperature uniformalizing means 4 acts as a medium of heat (conductor) to cause heat transfer by conduction in the radial direction of the flow channel 2. Namely, it was suggested that the temperature uniformalizing means 4 according to the present invention is effective not only in facilitating heat transfer by convection as mentioned above, but also in transferring heat by conduction.

In the above-mentioned working example, the identical temperature sensor was used as both the first measuring means 3 and the second measuring means 5. However, as a matter of course, in a preferred embodiment of the present invention, the first measuring means 3 and the second measuring means 5 can be constituted respectively by separate temperature sensors. In this preferred embodiment, temperature of the fluid at the first measuring point 3a and the second measuring point 5a can be measured at the same time. Even if the effect for uniformalizing temperature distribution attained by the temperature uniformalizing means 4 is insufficient, temperature distribution in the radial direction exemplified in FIG. 4 can be inferred to perceive the temperature of the fluid more accurately.

The invention claimed is:

1. A temperature sensor used for a mass flow meter, comprising:
   a flow channel through which a fluid flows, a temperature measuring means which has a temperature measuring point at a predetermined position inside said flow channel, and a temperature uniformalizing means disposed on an upstream side from said temperature measuring point in said flow channel, wherein:
   said temperature uniformalizing means comprises:
   a grid constituted by periodically arranged partitions and disposed so as to continuously extend in two or more different arbitrary directions in a plane perpendicular to a direction in which a fluid flows, and sub flow channels divided by said grid, and generates turbulence or vortexes of said fluid in a region on a downstream side from said temperature uniformalizing means and on an upstream side from said temperature measuring means, and
   an annular member which obstructs a flow of the said fluid flowing near an inner wall of said flow channel, said annular member is configured such that at least a part of said fluid after passing through a through hole of said annular member forms a vortex which spreads outward in the radial direction of said flow channel from said through hole.

2. The temperature sensor according to claim 1, wherein: said grid is constituted by mesh woven with wire formed of metal or alloy.

3. The temperature sensor according to claim 1, wherein: said grid is constituted by a porous object formed of metal or alloy.

4. The temperature sensor according to claim 1, wherein: said grid is constituted by a perforated metal formed of metal or alloy.

5. The temperature sensor according to claim 1, wherein:
said temperature measuring means has a temperature measuring point in a central part of a cross section of said flow channel.

6. The temperature sensor according to claim 1, wherein:
said temperature sensor further comprises a second temperature measuring means which has a temperature measuring point at a position other than a central part inside said flow channel, and both of the temperature measuring point of said temperature measuring means and the temperature measuring point of said second temperature measuring means are located on a same plane perpendicular to a direction in which the fluid flows.

7. The temperature sensor according to claim 1, wherein:
said flow channel comprises a heating means.

8. A mass flow meter comprising:
a flow channel through which a fluid flows, a temperature measuring means which has a temperature measuring point at a predetermined position inside said flow channel, and a temperature uniformalizing means disposed on an upstream side from said temperature measuring point in said flow channel, wherein:
said temperature uniformalizing means comprises:
   a grid constituted by periodically arranged partitions and disposed so as to continuously extend in two or more different arbitrary directions in a plane perpendicular to a direction in which a fluid flows, and sub flow channels divided by said grid, and generates turbulence or vortexes of said fluid in a region on a downstream side from said temperature uniformalizing means and on an upstream side from said temperature measuring means; and
   an annular member which obstructs a flow of the said fluid flowing near an inner wall of said flow channel, said annular member is configured such that at least a part of said fluid after passing through a through hole of said annular member forms a vortex which spreads outward in the radial direction of said flow channel from said through hole,
a flow sensor which measures a flow rate of a fluid flowing through said flow channel, wherein:
a measured temperature value of the fluid, measured by said temperature measuring means, is used to correct a measured flow rate value of the fluid, measured by said flow sensor to produce a corrected flow rate.

9. The mass flow meter of claim 8 wherein:
said grid is constituted by mesh woven with wire formed of metal or alloy.

10. The mass flow meter of claim 8, wherein:
said grid is constituted by a porous object formed of metal or alloy.

11. The mass flow meter of claim 8, wherein:
said grid is constituted by a perforated metal formed of metal or alloy.

12. The mass flow meter of claim 8, wherein: said temperature measuring means has a temperature measuring point in a central part of a cross section of said flow channel.

13. The mass flow meter of claim 8, wherein:
said temperature sensor further comprises a second temperature measuring means which has a temperature measuring point at a position other than a central part inside said flow channel, and both of the temperature measuring point of said temperature measuring means and the temperature measuring point of said second temperature measuring means are located on a same plane perpendicular to a direction in which the fluid flows.

14. The mass flow meter of claim 8, wherein:
said flow channel comprises a heating means.

15. A mass flow controller comprising:
a flow channel through which a fluid flows, a temperature measuring means which has a temperature measuring point at a predetermined position inside said flow channel, and a temperature uniformalizing means disposed on an upstream side from said temperature measuring point in said flow channel, wherein:
said temperature uniformalizing means comprises:
   a grid constituted by periodically arranged partitions and disposed so as to continuously extend in two or more different arbitrary directions in a plane perpendicular to a direction in which a fluid flows, and sub flow channels divided by said grid, and generates turbulence or vortexes of said fluid in a region on a downstream side from said temperature uniformalizing means and on an upstream side from said temperature measuring means;
   an annular member which obstructs a flow of the said fluid flowing near an inner wall of said flow channel, said annular member is configured such that at least a part of said fluid after passing through a through hole of said annular member forms a vortex which spreads outward in the radial direction of said flow channel from said through hole; and
a flow sensor which measures a flow rate of a fluid flowing through said flow channel, wherein:
a measured temperature value of the fluid, measured by said temperature measuring means, is used to correct a measured flow rate value of the fluid, measured by said flow sensor to produce a corrected flow rate;
a flow control valve which controls a flow rate of the fluid flowing through said flow channel, and
a controlling section to provide a control signal to said flow control valve such that the corrected flow rate becomes a predetermined target value.

* * * * *